(12) United States Patent
Quinn (10) Patent No.: US 12,031,568 B2
(45) Date of Patent: Jul. 9, 2024

(54) TUBE CONSTRUCTION SET

(71) Applicant: Spark Innovation, LLC, American Fork, UT (US)

(72) Inventor: Reed Quinn, American Fork, UT (US)

( * ) Notice: Subject to any disclaimer, the term of this patent is extended or adjusted under 35 U.S.C. 154(b) by 278 days.

(21) Appl. No.: 17/149,519

(22) Filed: Jan. 14, 2021

(65) Prior Publication Data

US 2022/0220990 A1  Jul. 14, 2022

(51) Int. Cl.
*F16B 7/04* (2006.01)

(52) U.S. Cl.
CPC .......... *F16B 7/0486* (2013.01); *F16B 7/0426* (2013.01)

(58) Field of Classification Search
CPC ............ Y10T 403/347; Y10T 403/342; Y10T 403/341; Y10T 403/34; F16B 7/185; F16B 7/042; F16B 7/044; F16B 7/0406; E04H 15/44; A63B 9/00; A63H 33/008; A63H 33/101; A63H 33/102
See application file for complete search history.

(56) References Cited

U.S. PATENT DOCUMENTS

| | | | | |
|---|---|---|---|---|
| 4,647,241 A | * | 3/1987 | Weber | F16B 7/0426 403/324 |
| 5,326,337 A | * | 7/1994 | Pardella | A63B 9/00 403/49 |
| 5,690,446 A | * | 11/1997 | Poissant | A63H 33/10 446/120 |
| 7,316,598 B1 | * | 1/2008 | Lock | A63H 33/102 446/85 |
| 9,187,924 B1 | * | 11/2015 | Jackson | E04H 15/44 |
| 10,278,886 B2 | * | 5/2019 | Fong | A61H 3/02 |
| 2006/0090786 A1 | * | 5/2006 | Lapping | E04H 15/44 135/121 |
| 2012/0157266 A1 | * | 6/2012 | Todokoro | A63B 9/00 482/35 |
| 2013/0294817 A1 | * | 11/2013 | Augustsson | F16B 2/06 403/217 |

FOREIGN PATENT DOCUMENTS

| | | | | |
|---|---|---|---|---|
| GB | 2349412 A | * | 11/2000 | F16B 7/042 |
| KR | 200310236 Y1 | * | 12/2002 | E04H 4/14 |
| WO | WO-2017019034 A1 | * | 2/2017 | E04H 4/14 |

* cited by examiner

*Primary Examiner* — Daniel J Wiley (74) *Attorney, Agent, or Firm* — Superior IP, PLLC; Dustin L. Call (57) ABSTRACT

A tube construction set. The tube construction set includes a set of tubes. Each tube includes a wall, where the wall is the body of the tube, a first end and a second end, where the second end is opposite the first end. Each tube also includes four holes near the first end of tube and four holes near the second end of the tube. The tube construction set also includes a set of connectors. Each connector is configured to attach two or more tubes to one another and includes a first port, where the first port is configured to receive a first tube a second port, where the second port is configured to receive a second tube. Each connector also includes a first hole near the first port and a second hole near the second port.

20 Claims, 8 Drawing Sheets

TUBE CONSTRUCTION SET

CROSS-REFERENCE TO RELATED APPLICATIONS

Not applicable.

BACKGROUND OF THE INVENTION

Traditional construction sets are not strong enough to support a child's weight. This limited how it can be played with. The reason kids can not climb on these sets is because the materials are not sturdy enough and or the parts do not lock together. Locking mechanisms can be both expensive and complex. Tubelox is durable, sturdy, and has a simple locking mechanism making it perfect for children that are both old enough to build structures with it and heave enough to need a robust construction set to support their weight.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a tube construction set. The tube construction set includes a set of tubes. Each tube in the set of tubes includes a wall, where the wall is the body of the tube, a first end and a second end, where the second end is opposite the first end. Each tube in the set of tubes also includes four holes near the first end of tube and four holes near the second end of the tube. The tube construction set also includes a set of connectors. Each connector in the set of connectors is configured to attach two or more tubes to one another and includes a first port, where the first port is configured to receive a first tube a second port, where the second port is configured to receive a second tube. Each connector in the set of connectors also includes a first hole near the first port and a second hole near the second port. The tube construction set further includes a set of connector clips. Each connector clip in the set of connector clips is configured to secure one tube within a port on one connector and includes a pin, where the pin is configured to through the one of the holes in one of the connectors into one of the holes in one of the tubes.

Another example embodiment includes a tube construction set. The tube construction set includes a set of tubes. Each tube in the set of tubes includes a wall, where the wall is the body of the tube, a first end and a second end, where the second end is opposite the first end. Each tube in the set of tubes also includes four holes near the first end of tube, where the four holes are spaced 90 degrees from one another, and four holes near the second end of the tube, where the four holes are spaced 90 degrees from one another. The tube construction set also includes a set of connectors. Each connector in the set of connectors is configured to attach two or more tubes to one another and includes a first port, where the first port is configured to receive a first tube a second port, where the second port is configured to receive a second tube. Each connector in the set of connectors further includes a first hole near the first port and a second hole near the second port. The tube construction set also includes a set of connector clips. Each connector clip in the set of connector clips is configured to secure one tube within a port on one connector. Each connector clip in the set of connector clips includes a pin, where the pin is configured to through the one of the holes in one of the connectors into one of the holes in one of the tubes and a clasp, where the clasp is configured to be secured around the connector near a port.

Another example embodiment includes a tube construction set. The tube construction set includes a set of tubes. Each tube in the set of tubes includes a wall, where the wall is the body of the tube, a first end and a second end, where the second end is opposite the first end. Each tube in the set of tubes also includes four holes near the first end of tube, where the four holes are spaced 90 degrees from one another, and four holes near the second end of the tube, where the four holes are spaced 90 degrees from one another. The tube construction set also includes a set of connectors. Each connector in the set of connectors is configured to attach two or more tubes to one another and includes a first port, where the first port is configured to receive a first tube a second port, where the second port is configured to receive a second tube. Each connector in the set of connectors further includes a first hole near the first port and a second hole near the second port. The tube construction set also includes a set of connector clips. Each connector clip in the set of connector clips is configured to secure one tube within a port on one connector and includes a pin, where the pin is configured to through the one of the holes in one of the connectors into one of the holes in one of the tubes and. Each connector clip in the set of connector clips includes a clasp, where the clasp is configured to be secured around the connector near a port and one or more features which allow for removal of the connector clip. The tube construction set further includes a set of wheels, where each wheel in the set of wheels is configured to be placed on a tube and a set of hubs, where each hub in the set of hubs is configured to secure the wheel to the tube. The tube construction set moreover includes a set of panels. Each panel in the set of panels includes cutoff corners and one or more rims, where the one or more rims are configured to prevent the panel from moving relative to the tubes.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
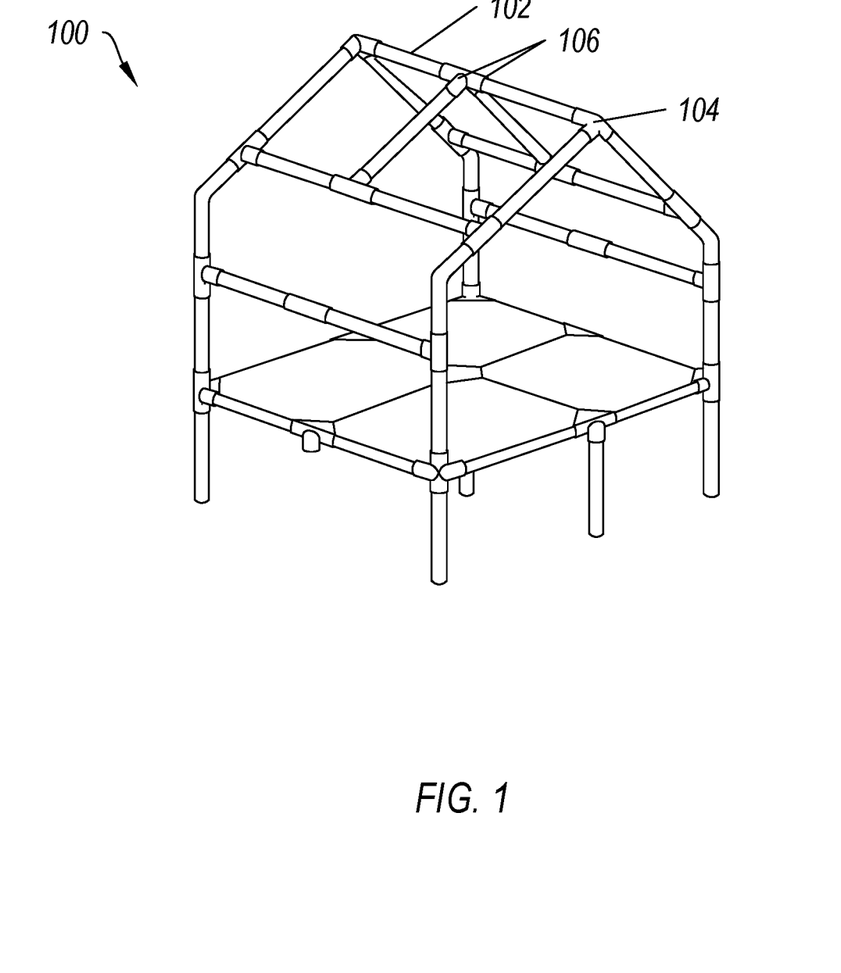
FIG. 1 illustrates an example of a tube construction set.

FIG. 1 illustrates an example of a tube construction set 100. The tube construction set 100 can be configured in multiple orientations to create different designs. In particular, the tube construction set 100 can be assembled even by young users into multiple designs. The tube construction set 100 designs are sturdy enough that they can support some weight. For example, the tube construction set 100 can be used to create a wagon, in which a child is able to sit.

FIG. 1 shows that the tube construction set 100 can include a tube 102. The tube 102 acts as the "scaffolding" or main body of the construction set 100. In particular, the tube 102 can support weight and form the majority of the material used. Thus, the tube 102 needs to be strong enough to support the final weight of the design and also anything placed on the final design. I.e., if the tube construction set 100 is being used to construct a chair, then the tube 102 needs to support the weight of the seat and any user which sits in the chair.

FIG. 1 also shows that the tube construction set 100 can include a connector 104. The connector 104 is configured to attach two or more tubes 102 to one another. That is, the connector 104 allows tubes 102 to be connected to one another in a desired configuration. The connector 104 determines the angle between the tubes 102. For example, the tubes 100 can be connected in a straight line, at 45 degree angles, at 90 degree angles, at 135 degree angles, etc. Virtually any angle can be created although practicality tends to limit angles to 180 degrees (straight), 135 degrees, 90 degrees and/or 45 degrees. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

FIG. 1 further shows that each connector 104 can include at least two ports 106 to receive tubes 102. That is, the connector 104 has multiple ports 106 which have an inner diameter which is larger than the outer diameter of the tube 102. Each port 106 is an opening large enough to receive a tube 102. This allows the tube 102 to be inserted into the port and secured, as described below.

Figure 2A:
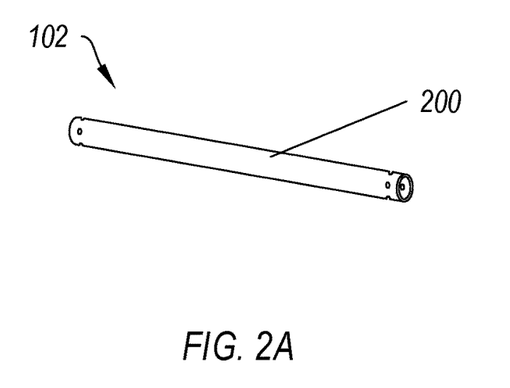
FIG. 2A illustrates an example of a straight tube.
Figure 2B:
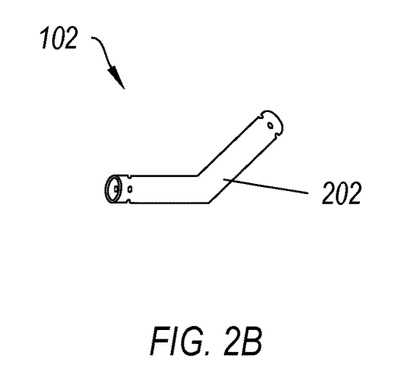
FIG. 2B illustrates an example of a bent tube.

FIGS. 2A-2B (collectively "FIG. 2") illustrate an example of a tube 102. FIG. 2A illustrates an example of a straight tube 102; and FIG. 2B illustrates an example of a bent tube 102. The tube 102 is a hollow cylindrical body. The tube 102 can be made of any desired material. The bent tube 102 can include a 135 degree angle, allowing for the construction of corners or other structures without straight edges.

FIG. 2 shows that the tube 102 can include a wall 202. The wall 202 is body of the tube 102. The wall 202 will be the material which structurally supports the tube construction set 100. That is, the wall 202 is what actually supports the weight that is placed on the tube 102. Therefore, the thickness and configuration of the wall 202 is critical to ensure that the tube construction set 100 is capable of constructing the desired designs. For example, the wall 202 can be constructed of rigid polyvinyl chloride (colloquial: polyvinyl or vinyl; abbreviated: PVC) or Polypropylene. The PVC can include other additives which strengthen the PVC. In particular, the PVC can include tin based stabilizers, impact modifiers, lubricants, etc. to create the desired composition. Without the additives, the PVC may be too brittle too support the desired weight.

Likewise, the wall 202 can be thick enough to support the desired weight, but not too thick which creates a product that is too heavy to be used by younger users. For example, the wall 202 can be between 2 and 5 millimeters thick. In particular, the wall 2020 can be approximately 3 millimeters thick. In addition, the length of the wall 202 can be critical to ensure that the desired designs can be created. For example, the wall 202 can be between 275 and 415 millimeters long for a long tube and 130 and 190 millimeters long for a short tube. In particular, the wall 202 can be approximately 345 millimeters long and approximately 160 millimeters long for a short tube. As used in the specification and the claims, the term approximately shall mean that the value is within 10% of the stated value, unless otherwise specified.

FIG. 2 also shows that the tube 102 can include one or more holes 204. The one or more holes 204 allow connection between tubes 102 via connectors. The placement of the one or more holes 204 can be critical to ensure that the connection is easy to make and stable. I.e., if the holes 204 aren't placed correctly then the connection can cause the final design to fail, especially when weight is placed on the final design. Thus, the tolerance is low for hole 204 placement, as discussed below.

The one or more holes 204 are spaced at 90 degrees (i.e., there can be four holes equally spaced) from one another. One of skill in the art will appreciate that the holes 204 that are opposite one another need to be parallel to opposing holes on the other end of the tube 102. That is holes on opposing edges of the tube 102 are on the same "edges" or "faces" as one another. This means, for example, that four tubes 102 connected and secured at 90 degree angles can be used to form a square or rectangle. If the holes 204 aren't parallel, then multiple connected tubes 102 couldn't be made to lie within the same plane. The correct orientation of holes 204 is ensured by the manufacturing process, as described below.

In addition, the holes 204 are near each end of the tube 102. As used in the specification "near" the end of the tube shall mean that it is closer to the end of the tube 102 than to the center line of the tube. That is "near" means that the holes 204 are in the ¼ of the tube which is closest to the end of the tube 102. The distance of the holes 204 from the edges of the tube 102 are critical to ensure that they can be secured using the appropriate connectors. That is, the holes 204 have to be able to align with connectors or they can't be secured and the resulting design would be unstable. For example, the holes 204 can be between 3 and 15 millimeters from the edge of the tube 102. In particular, the holes 204 can be approximately 5 millimeters from the edge of the tube 102.

Figure 3:
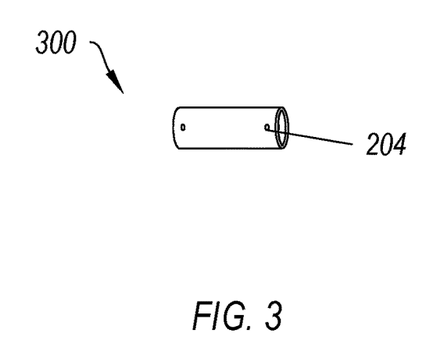
FIG. 3 illustrates a straight connector type.

FIG. 3 illustrates a straight connector type 300. The straight connector type 300 allows for two tubes to be connected in a straight line relative to one another. That is, the connector 300 allows a first tube and a second tube to be connected and joined as if they were a single longer tube. In order to accomplish this, the straight connector type 300 is a tube with an inside diameter that is slightly larger than the outside diameter of tubes which will be inserted.

FIG. 3 shows that the straight connector 300 has holes 204 which are inline with one another, just as in the tubes themselves, described above. That is, the holes 204 are on a single face of the straight connector 300. In the straight connector 300, and all following connectors, the holes 204 are different than the opening forming the port 106 of the connector 300. That is, the holes 204 and the ports 106 are different openings than one another and in no cases is an opening both a hole 204 and a port 106. However, in each case the holes 204 are near a port 106. As used in the specification and the claims "near a port" shall mean that the hole 204 is nearer the opening of said port than any other opening of any other port on the connector.

Figure 4:
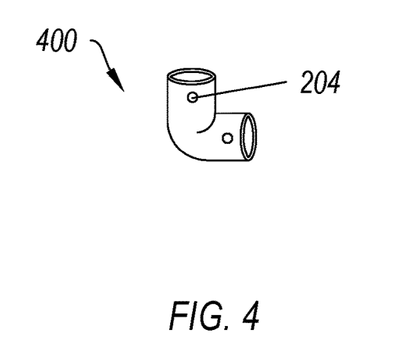
FIG. 4 illustrates an elbow connector.

FIG. 4 illustrates an elbow connector 400. The elbow connector 400 connects a first tube and a second tube to be connected at a 90 degree angle to one another. The elbow connector 400 has holes 204 which are on the same face as one another. The placement of the holes 204 are critical to ensure that the tubes will have the proper orientation when the final design is complete such that each tube can be secured in the elbow connector 400, as described below.

Figure 5:
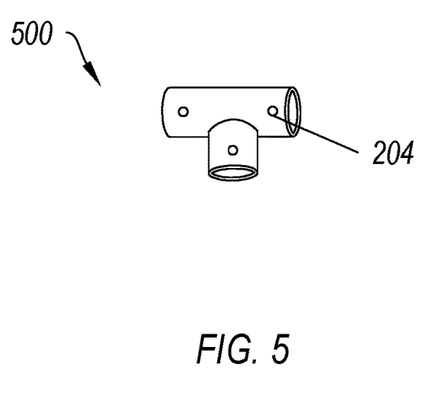
FIG. 5 illustrates a T-shaped connector.

FIG. 5 illustrates a T-shaped connector 500. T-shaped connector 5 allows for three tubes to be connected with two tubes in a straight line and the third tube at a 90 degree angle relative to the other two tubes. The T-shaped connector 500 has holes 204 which are on the same face as one another. The placement of the holes 204 can be critical to ensure that the tubes are oriented in such a way that the overall design can be constructed. In particular, if the connectors are not on the same face, then the tubes have to be rotated to be secured. That means that they will not be in a position when connected to one another once connected through other connectors.

Figure 6:
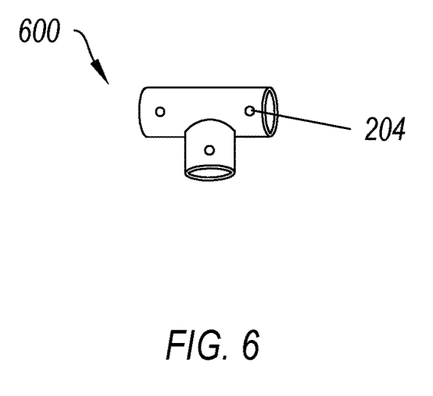
FIG. 6 illustrates an alternative T-shaped connector.

FIG. 6 illustrates an alternative T-shaped connector 600. The alternate T-shaped connector 600 allows for rotation of the tubes when connected. That is, they are different than the connector 500 of FIG. 5 in that the tube can pass all the way through the connector creating a hinge which allow for builds with moving parts.

Figure 7:
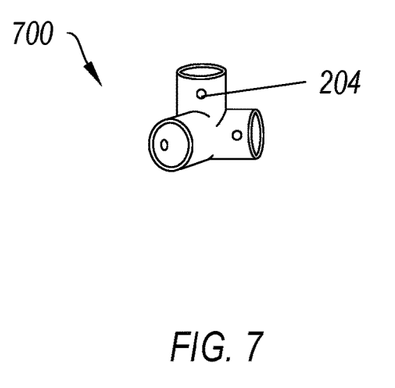
FIG. 7 illustrates a 3-way corner connector.

FIG. 7 illustrates a 3-way corner connector 700. The 3-way corner connector 700 connects three tubes that are perpendicular to one another. That is, instead of all tubes being in a single plane, such as in the connector 500 of FIG. 5 and the connector 600 of FIG. 6, the tubes are not planar to one another and instead each tube is normal to the plane formed by the other two tubes. The holes 204 in the corner connector 700 need to be oriented such that the clips which secure the tubes within the connector 700 do not interfere with one another. Thus, the holes 204 of two ports are oriented parallel to one another (such as the right and upper holes 204 in the drawing of FIG. 7) and the third is oriented away (either the back left or bottom of the final port of FIG. 7).

Figure 8:
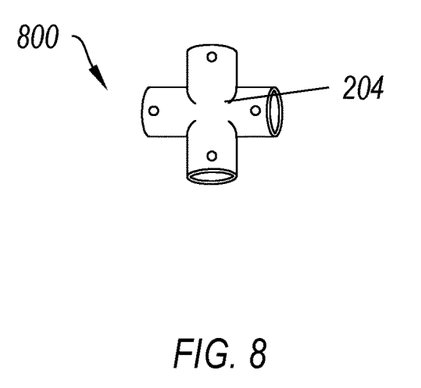
FIG. 8 illustrates a 4-way cross connector.

FIG. 8 illustrates a 4-way cross connector 800. The 4-way cross connector connects 800 four tubes to one another in a single plane. That is, all four tubes form a + shape in a single plane. The holes 204 in the connector are on a single face. Because the tubes will reside in a single plane, the clips will not interfere with one another when securing all four tubes.

Figure 9:
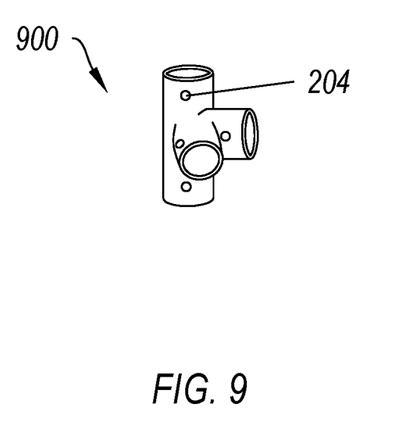
FIG. 9 illustrates a 4-way prong connector.

FIG. 9 illustrates a 4-way prong connector 900. The 4-way prong connector 900 connects four tubes to one another with three tubes forming a plane, and the other tube normal to said plane. I.e., two tubes form a straight line with the third tube perpendicular to the first two tubes and the fourth tube perpendicular to the first three tubes. The holes 204 in the connector 900 are oriented with three of the holes 204 on a single face, the same face from which the fourth port extends. The hole in the fourth port is oriented away from the other holes 204.

Figure 10:
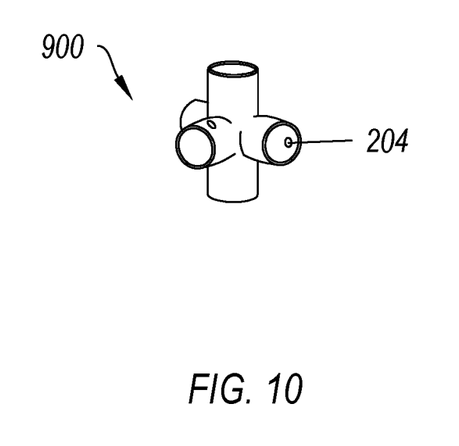
FIG. 10 illustrates a 5-way prong connector.

FIG. 10 illustrates a 5-way prong connector 1000. The 5-way prong connector 1000 allows five tubes to be connected to one another. The first four tubes are in a single plane, just as in the 4-way cross connector 800 of FIG. 8. The fifth tube extends perpendicularly from the plane formed by the first four tubes. The holes 204 in the first four ports are on a single face. In particular, all of the holes 204 in the first four ports are oriented away from the fifth port. The hole 204 in the fourth port is oriented along the axis of one of the first four ports.

The connectors of FIGS. 2-10 can include any desired material. For example, the connectors can include polypropylene. Polypropylene (PP), also known as polypropene, is a thermoplastic polymer used in a wide variety of applications. It is produced via chain-growth polymerization from the monomer propylene. Polypropylene can easily be made into any desired shape by placing the liquid polymer into a mold and then allowed to cool.

Figure 11:
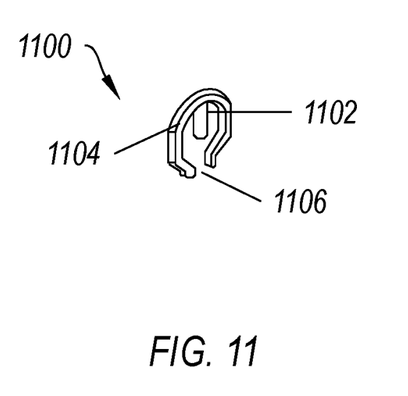
FIG. 11 illustrates an example of a connector clip.

FIG. 11 illustrates an example of a connector clip 1100. The connector clip 1100 is configured to secure a tube within a connector, such as the connectors discussed above. In particular, the connector clip 1100 prevents the tube from being removed from a port and prevents rotation of the tube.

FIG. 11 shows that the connector clip 1100 includes a pin 1102. The pin 1102 is configured to pass through a hole in the connector and a hole in the tube. This prevents any change in position or orientation of the tube relative to the connector. That is, the tube cannot be removed from the connector or twisted within the connector. This adds strength and stability to the final design and construction.

FIG. 11 also shows that the connector clip 1100 includes a clasp 1104. The clasp 1104 is configured to go around the port of the connector. In particular, the interior of the clasp 1104 is circular in shape, therefore it sits on the outside of the port of the connector. That is, the interior of the clasp 1104 is flush with the outside of the connector port.

In addition, the clasp 1104 has an opening 1106. The opening 1106 allows the clip 1100 to be placed around a connector. That is, the opening 1106 can be placed against a connector and pushed, which slides the clasp 1104 onto the port of the connector. The opening needs to be large enough that the clasp 1104 can be placed on the connector but not so large that it slips off to easily.

Moreover, the clasp 1104 can include portions along the outside edge that allow for easier removal. For example, the clasp 1104 can include flat portions which allow a user to more easily pull on the clasp 1104 during removal. Likewise, the clip can be thick enough that it can be grasped and pulled for removal.

Figure 12:
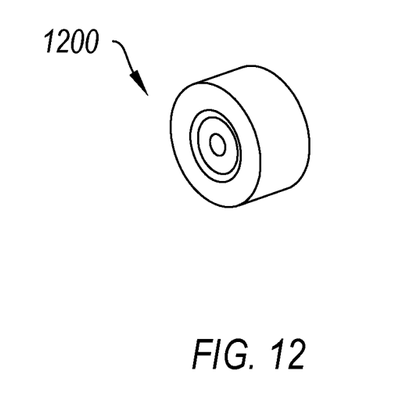
FIG. 12 illustrates an example of a wheel.

FIG. 12 illustrates an example of a wheel 1200. The wheel 1200 can be placed on a tube. That is, there is a portion of the wheel 1200 which is similar in size to the size of a tube, such that a tube can be inserted into the wheel 1200 to act as an axle. The wheel 1200 allows a user to build designs which can actually move and function (e.g., wheelbarrows, cars, etc.).

Figure 13:
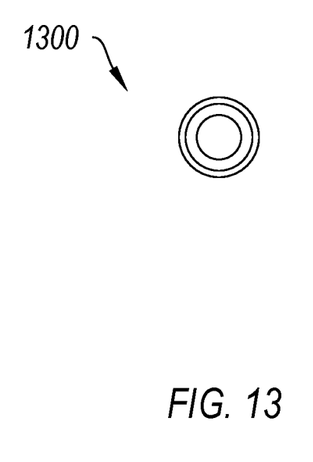
FIG. 13 illustrates an example of a hub.

FIG. 13 illustrates an example of a hub 1300. The hub 1300 can be secured to a tube using the clip 1100 of FIG. 11. The hub 1300 holds a wheel, such as the wheel 1200 of FIG. 12, in position. Without the hub 1300 the rotation of the wheel would eventually cause the wheel to spin off the tube. Thus, the hub 1300 includes a hole that can be secured to the tube using the clip 1100 of FIG. 11 to prevent removal of the wheel.

Figure 14:
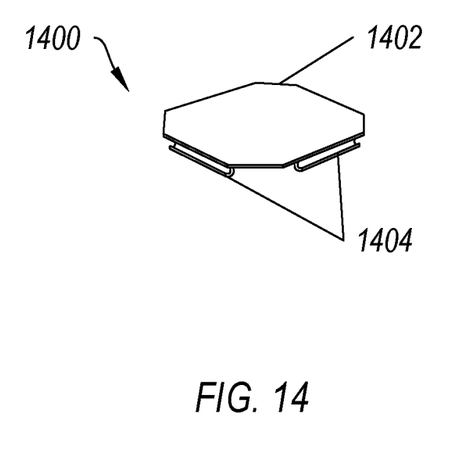
FIG. 14 illustrates an example of a panel.

FIG. 14 illustrates an example of a panel 1400. The panel 1400 can be placed on a set of tubes in order to create a flat surface. In particular, four tubes can be connected to one another in a square, with the panel 1400 resting on the tubes to create a flat surface.

FIG. 14 shows that the panel 1400 includes cutoff corners 1402. The cutoff corners 1402 prevent the panel 1400 from resting on the connectors. That is, without the cutoff corners 1402 then much or all of the weight of the panel 1400 would rest on the connectors rather than the tubes. Thus, the cutoff corners 1402 ensure that the weight of the panel 1400 all rests on the tubes.

FIG. 14 also shows that the panel 1400 includes one or more rims 1404. The rims 1404 are configured to prevent the panel 1400 from moving relative to the tubes. That is, as the panel 1400 is placed, the rims 1404 will be near the tubes, preventing to much side to side motion of the panel 1400 relative to the tubes. This allows the panel to be placed but not move relative to the tubes.

Figure 15:
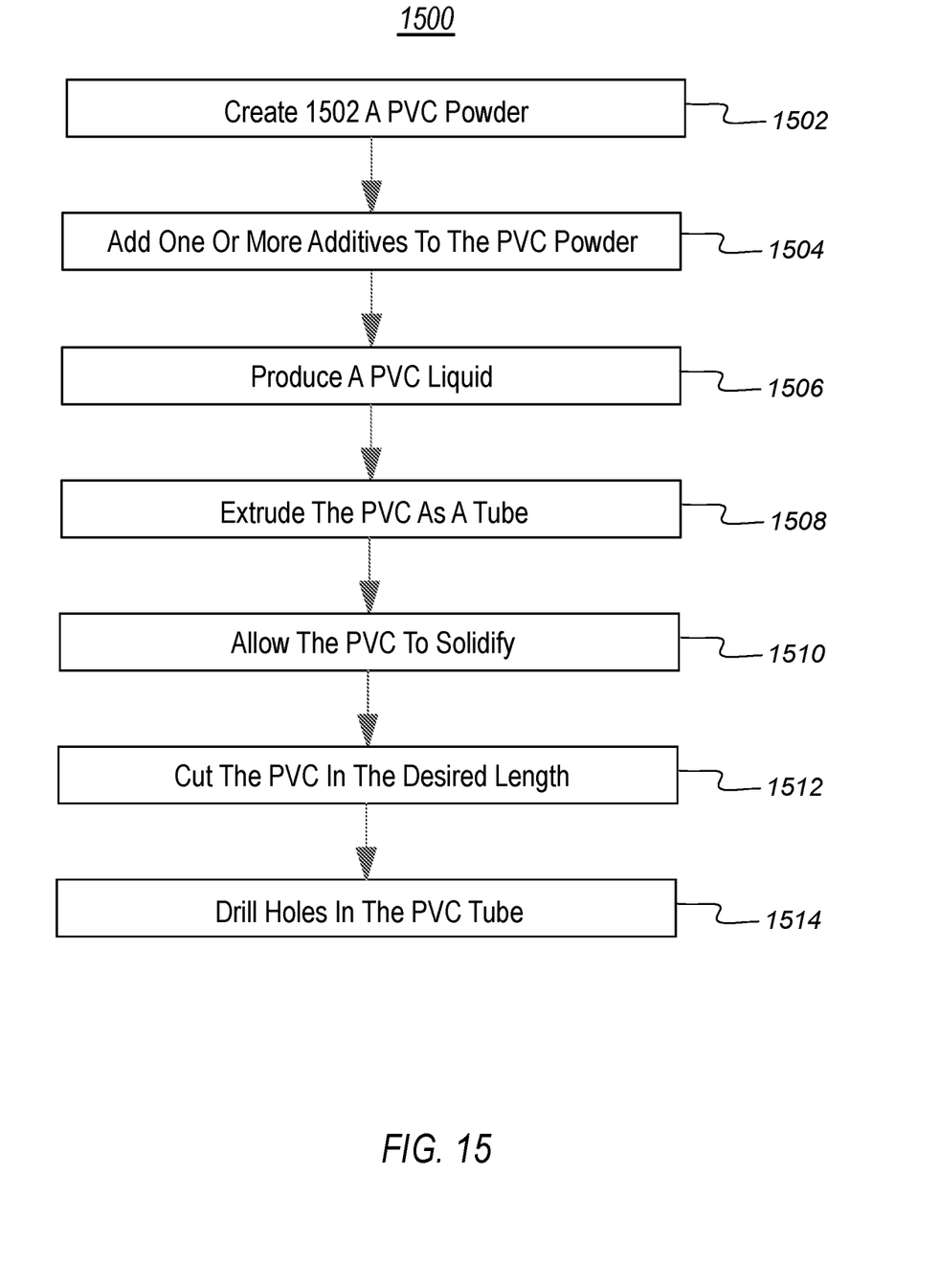
FIG. 15 is a flowchart illustrating a method of manufacturing a tube for a tube construction set.

FIG. 15 is a flowchart illustrating a method 1500 of manufacturing a tube for a tube construction set. In at least one implementation, the tube for a tube construction set can include the tube 102 for a tube construction set of FIGS. 1-2. Therefore, the method 1500 will be described, exemplarily, with reference to the tube 102 for a tube construction set of FIGS. 1-2. Nevertheless, one of skill in the art can appreciate that the method 1500 can be used to produce a tube for a tube construction set other than the tube 102 for a tube construction set of FIGS. 1-2.

FIG. 15 shows that the method 1500 can include creating 1502 a PVC powder. The PVC powder is created 1502 from a PVC slurry. The PVC slurry is the liquid or semi-solid which can harden into a solid PVC. The PVC slurry is created by suspension of vinyl chloride monomers in a solvent. The monomers are ready for polymerization, which can be controlled to dictate the length of the polymer. The slurry also includes one or more initiators which creates the reaction which leads to polymerization. After polymerization the slurry is refined (e.g., degassed, excess monomer removed from the slurry, etc.) and dried. The dried slurry creates 1502 a powder which can be used to create solid PVC.

FIG. 15 also shows that the method 1500 can include adding 1504 one or more additives to the PVC powder. The additives can change the characteristics of the resulting PVC. For example, the additives can include tin based stabilizers, impact modifiers, lubricants, etc. to create the desired composition.

FIG. 15 further shows that the method 1500 can include producing 1506 a PVC liquid. The PVC liquid can be created by heating the mixture of the PVC powder and additives. The PVC liquid has high viscosity so that it can be manipulated. That is, the PVC powder is heated only enough to begin to form a liquid, but the viscosity needs to remain high for final production.

FIG. 15 additionally shows that the method 1500 can include extruding 1508 the PVC as a tube. The tubes can be molded but given their length extrusion makes the production move more quickly. Extrusion is a process used to create objects of a fixed cross-sectional profile. A material is pushed through a die of the desired cross-section. Extrusion may be continuous (theoretically producing indefinitely long material) or semi-continuous (producing many pieces). Also referred to as "hole flanging", hollow cavities within extruded material cannot be produced using a simple flat extrusion die, because there would be no way to support the center barrier of the die. Instead, the die assumes the shape of a block with depth, beginning first with a shape profile that supports the center section. The die shape then internally changes along its length into the final shape, with the suspended center pieces supported from the back of the die. The material flows around the supports and fuses together to create the desired closed shape.

FIG. 15 moreover shows that the method 1500 can include allowing 1510 the PVC to solidify. As the PVC cools, it hardens into a solid. How flexible the solid is depends on the additives which are added 1504. Some PVC solids can be quite flexible and some have almost no flexibility. In general, the more flexible, the less brittle the solid PVC will be. I.e., when the solid PVC is less flexible it is stronger but also more brittle.

FIG. 15 also shows that the method 1500 can include cutting 1512 the PVC in the desired length. The PVC can be cut before the PVC is allowed 1510 to solidify; however, because there may be shrinking when the PVC is allowed 1510 to solidify, cutting 1512 before solidification leads to more variation of the final length. Thus, allowing 1510 the PVC to solidify before cutting 1512 results in more uniformity of length.

FIG. 15 additionally shows that the method 1500 can include drilling 1514 holes in the PVC tube. The drilling of the holes 1514 requires that the holes are placed with high precision, as described above. The method of accomplishing this precision is described below.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 16:
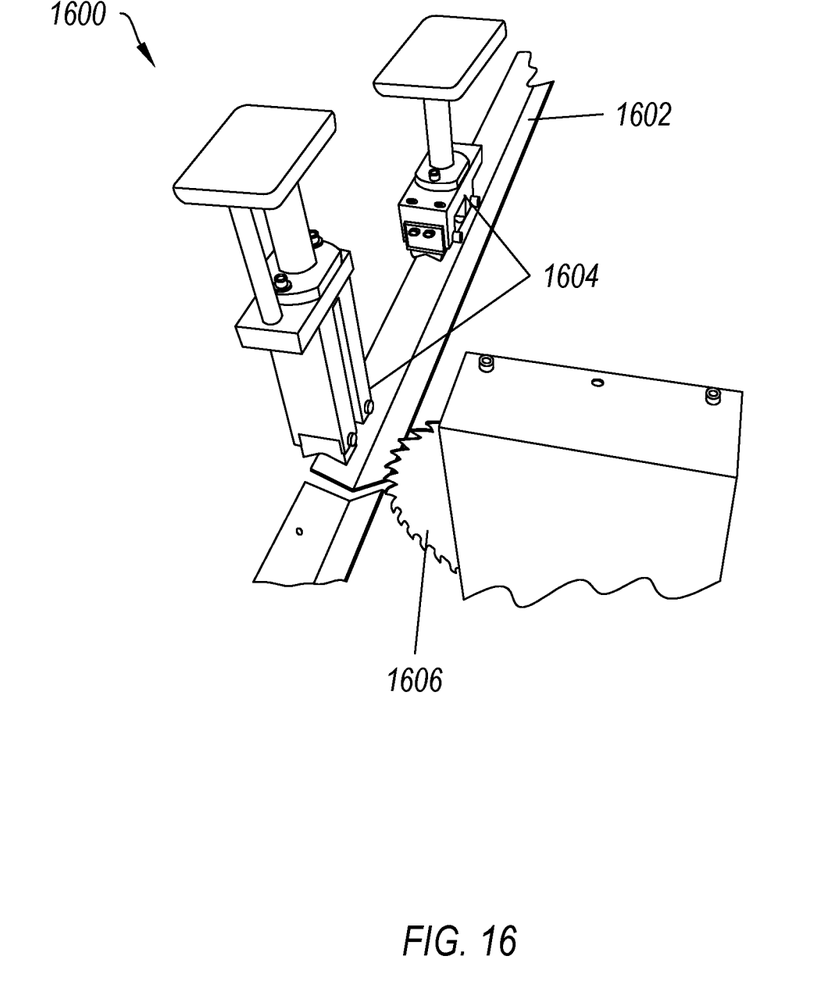
FIG. 16 illustrates an example of a cutting machine.

FIG. 16 illustrates an example of a cutting machine 1600. The cutting machine 1600 cuts the tubes to the desired length. The cutting machine 1600 needs to cut the tube with high precision. If the tube length is off, then the hole drilling machine may drill holes at the wrong location, causing a problem when tubes are secured to connectors.

FIG. 16 shows that the cutting machine 1600 can include a trough 1602. The trough 1602 places the tube in the correct position. That is, the trough 1602 includes a long shallow depression in which the tube will reside. Thus, the trough 1602 ensures that the tube is in a known position prior to cutting. The trough 1602 has a space where the cutting will actually occur. That is, the trough 1602 has two segments that have a gap between them.

FIG. 16 also shows that the cutting machine 1600 can include a clamp 1604. The clamp 1604 stops the tube from moving in two directions. First, the clamp 1604 pushes the tube into the bottom of the trough 1602, preventing vertical movement of the tube relative to the trough 1602. This is especially important during the cutting motion as cutting can cause the tube to "jump" in the trough 1602. Second, the clamp 1604 can prevent movement of the tube along the trough 1602. That is, the pressure of the clamp 1604 can prevent lateral movement of the tube relative to the trough 1602. One of skill in the art will appreciate that lateral movement can also be prevented using stops or other mechanisms. The cutting machine 1600 can include multiple clamps 1604 to ensure that there are multiple pressure points and/or that both segments are clamped even after cutting.

FIG. 16 also shows that the cutting machine 1600 can include a blade 1606. The blade 1606 is rotated at a high speed to cut through the tube. During cutting, the blade 1606 passes through the gap in the trough 1602. The blade 1606 will be left in motion during normal operation. I.e., a tube is placed in the trough 1602, moved into position, help in position by the clamp 1604, cut by the blade 1606, then the tube is moved so that another segment can be cut; therefore, the blade 1606 does not need to be stopped between cuts.

Figure 17:
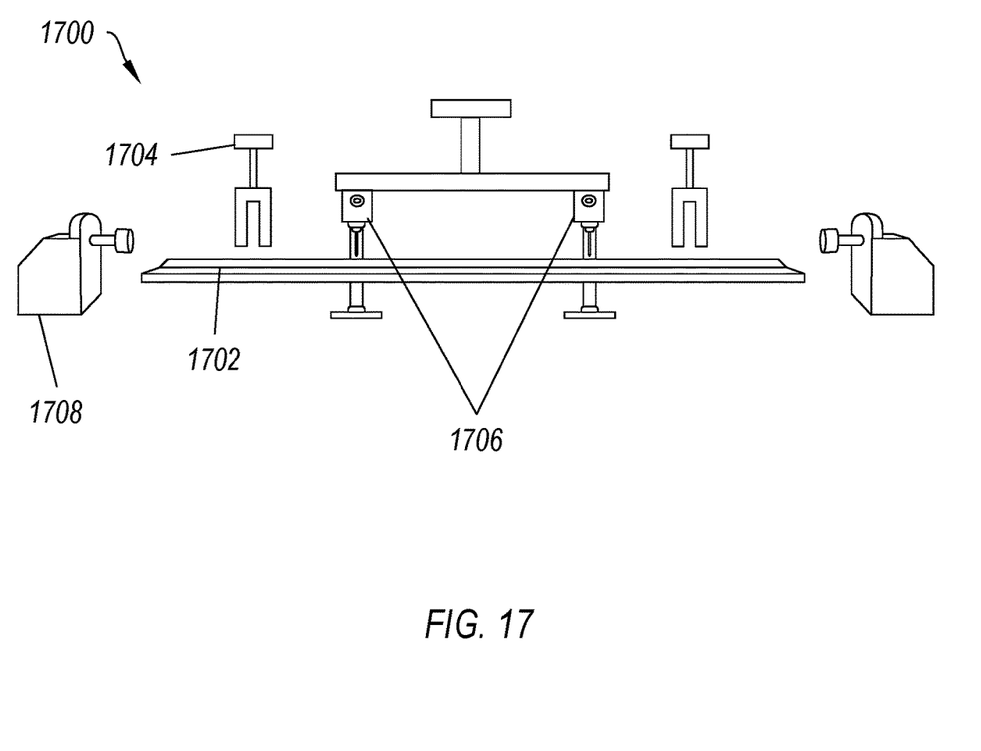
FIG. 17 illustrates an example of a gang drilling machine.

FIG. 17 illustrates an example of a gang drilling machine 1700. The gang drilling machine 1700 creates the holes in the tubes. The holes need to be placed with high precision, as described above. There are two important ways in which the holes need to be aligned. In the first, holes at opposite ends need to be exactly in line with one another. This ensures that the final design can be formed properly. The second is that holes along any end need to be exactly 90 degrees from one another. The tolerance is smaller than one degree and is preferred at only 0.5 degrees.

FIG. 17 shows that the gang drilling machine 1700 can include a trough 1702. The trough 1702 places the tube in the correct position. That is, the trough 1702 includes a long shallow depression in which the tube will reside. Thus, the trough 1702 ensures that the tube is in a known position prior to drilling. The trough 1702 has spaces where the drilling will actually occur. For example, the trough 1702 can have multiple segments that have a gap between them or holes in the bottom of the trough 1702 where the drill bit will pass through.

FIG. 17 also shows that the gang drilling machine 1700 can include a clamp 1704. The clamp 1704 stops the tube from moving in two directions. First, the clamp 1704 pushes the tube into the bottom of the trough 1702, preventing vertical movement of the tube relative to the trough 1702. This is especially important during the drilling motion as drilling can cause the tube to "jump" in the trough 1702. Second, the clamp 1704 can prevent movement of the tube along the trough 1702. That is, the pressure of the clamp 1704 can prevent lateral movement of the tube relative to the trough 1702. One of skill in the art will appreciate that lateral movement can also be prevented using stops or other mechanisms. The cutting machine 1700 can include multiple clamps 1704 to ensure that there are multiple pressure points and/or that both segments are clamped even after drilling.

FIG. 17 shows that the gang drilling machine 1700 can include a pair of drill presses 1706. The drill presses 1706 (also known as a pedestal drill, pillar drill, or bench drill) are a style of drill that is permanently mounted within the gang drilling machine 1700. Major components of a drill press 1706 include a base, column (or pillar), adjustable table, spindle, chuck, and drill head, usually driven by an electric motor. When the tube is placed, the pair of drill presses 1706 are moved parallel to one another drilling four holes, two on each opposing ends.

FIG. 17 also shows that the gang drilling machine can include a servomotor 1708. The servomotor 1708 is a rotary actuator or linear actuator that allows for precise control of angular or linear position, velocity and acceleration. It consists of a suitable motor coupled to a sensor for position feedback. It also requires a relatively sophisticated controller, often a dedicated module designed specifically for use with servomotors. Thus, the servomotor 1708 turns the tube exactly 90 degrees within the desired tolerance. This can be done by pushing the servomotor 1708 onto the tube or having a portion of the servomotor 1708 which grips the tube.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tube construction set, the tube construction set comprising:
    a set of tubes, each tube in the set of tubes includes:
    a wall, wherein the wall is the body of the tube;
    a first end;
    a second end, wherein the second end is opposite the first end; four holes near the first end of tube; and
    four holes near the second end of the tube;
    a set of connectors, wherein each connector in the set of connectors: is configured to attach two or more tubes to one another; and includes:
    a first port, wherein the first port is configured to receive a first tube;
    a second port, wherein the second port is configured to receive a second tube;
    a first hole near the first port; and
    a second hole near the second port;
    a set of connector clips, wherein each connector clip in the set of connector clips: is configured to secure one tube within a port on one connector; and includes a pin, wherein the pin extends through the one of the holes in one of the connectors into one of the holes in one of the tubes; and
    a set of panels, wherein each panel in the set of panels includes: cutoff corners such that abutting panels would form contiguous openings at the corners thereof; and
    a set of rims, wherein: the rims are configured to prevent the panel from moving relative to the tubes in three dimensions;
    the set of rims includes a rim on each edge of the panel; and
    each rim includes an interior portion, wherein the interior portion is the same size and shape as the exterior of the wall.

2. The tube construction set of claim 1, wherein the wall is between 2 and 5 millimeters thick.

3. The tube construction set of claim 2, wherein the wall is approximately 3 millimeters thick.

4. The tube construction set of claim 1, wherein the four holes near the first end of the tube are spaced approximately 90 degrees from one another.

5. The tube construction set of claim 4, wherein the tolerance in the spacing between the holes is one degree.

6. The tube construction set of claim 4, wherein the tolerance in the spacing between the holes is 0.5 degrees.

7. The tube construction set of claim 4, wherein the four holes near the second end of the tube are spaced approximately 90 degrees from one another and each hole is in line with a hole on the first end.

8. The tube construction set of claim 7, wherein the tolerance in the spacing between the holes is one degree.

9. The tube construction set of claim 7, wherein the tolerance in the spacing between the holes is 0.5 degrees.

10. The tube construction set of claim 1, wherein the four holes near the first end of the tube are between 3 and 15 millimeters from the first end.

11. The tube construction set of claim 10, wherein the four holes near the first end of the tube are approximately 5 millimeters from the first end.

12. A tube construction set, the tube construction set comprising:
a set of tubes, each tube in the set of tubes includes:
a wall, wherein the wall:
is the body of the tube; and
is circular, with an interior diameter and an exterior diameter;
a first end;
a second end, wherein the second end is opposite the first end;
four holes near the first end of tube, wherein the four holes are spaced 90 degrees from one another; and
four holes near the second end of the tube, wherein the four holes are spaced 90 degrees from one another;
a set of connectors, wherein each connector in the set of connectors: is configured to attach two or more tubes to one another; and includes:
a first port, wherein the first port is configured to receive a first tube;
a second port, wherein the second port is configured to receive a second tube;
a first hole near the first port; and
a second hole near the second port;
a set of connector clips, wherein each connector clip in the set of connector clips: is configured to secure one tube within a port on one connector; and includes:
a pin, wherein the pin extends through the one of the holes in one of the connectors into one of the holes in one of the tubes; and
a clasp, wherein the clasp is configured to be secured around the connector near a port; and a set of panels, wherein each panel in the set of panels includes:
cutoff corners on a surface of the panel such that abutting panels would form contiguous openings at the corners thereof; and a set of rims, wherein: the set of rims extend perpendicularly from the surface of the panel; the set of rims are configured to prevent the panel from moving in all directions relative to the tubes;
the set of rims includes a rim on each edge of the panel; and each rim includes an interior portion.

13. The tube construction set of claim 12, wherein at least one tube is between 275 and 415 millimeters in length.

14. The tube construction set of claim 13, wherein the at least one tube is approximately 345 millimeters in length.

15. The tube construction set of claim 12, wherein at least one tube is between 130 and 190 millimeters in length.

16. The tube construction set of claim 15, wherein the at least one tube is approximately 160 millimeters in length.

17. A tube construction set, the tube construction set comprising:
a set of tubes, each tube in the set of tubes includes:
a wall, wherein the wall: is the body of the tube; and is circular, with an interior diameter and an exterior diameter;
a first end;
a second end, wherein the second end is opposite the first end;
four holes near the first end of tube, wherein the four holes are spaced 90 degrees from one another; and
four holes near the second end of the tube, wherein the four holes are spaced 90 degrees from one another;
a set of connectors, wherein each connector in the set of connectors: is configured to attach two or more tubes to one another; and includes:
a first port, wherein the first port is configured to receive a first tube;
a second port, wherein the second port is configured to receive a second tube;
a first hole near the first port; and
a second hole near the second port; and
a set of connector clips, wherein each connector clip in the set of connector clips: is configured to secure one tube within a port on one connector; and includes:
a pin, wherein the pin extends through the one of the holes in one of the connectors into one of the holes in one of the tubes; and
a clasp, wherein the clasp is configured to be secured around the connector near a port; and
one or more features which allow for removal of the connector clip;
a set of wheels, wherein each wheel in the set of wheels is configured to be placed on a tube; a set of hubs, wherein each hub in the set of hubs is configured to secure the wheel to the tube; and
a set of panels, wherein each panel in the set of panels includes:
cutoff corners such that abutting panels would form contiguous openings at the corners thereof; and
a set of rims, wherein: the set of rims are configured to prevent the panel from moving relative to the tubes in all directions;
the set of rims includes a rim on each edge of the panel; each rim extends along the majority of the edge to which it is attached; and each rim includes an interior portion.

18. The tube construction set of claim 17, wherein each of the tubes is comprised of polyvinyl chloride and includes one or more additives.

19. The tube construction set of claim 17, wherein each of the connectors is comprised of polypropylene.

20. The tube construction set of claim 17, wherein each of the panels is comprised of polypropylene.

* * * * *